United States Patent [19]

Okoshi

[11] Patent Number: 4,572,016
[45] Date of Patent: Feb. 25, 1986

[54] INFINITELY VARIABLE TRACTION ROLLER TRANSMISSION

[75] Inventor: Hideo Okoshi, Fujisawa, Japan
[73] Assignee: Nippon Seiko Kabushiki Kaisha, Tokyo, Japan
[21] Appl. No.: 766,661
[22] Filed: Aug. 15, 1985

Related U.S. Application Data

[63] Continuation of Ser. No. 447,684, Dec. 7, 1982, abandoned.

[30] Foreign Application Priority Data

Dec. 14, 1981 [JP] Japan .................... 56-200197
Dec. 18, 1981 [JP] Japan .................... 56-203465

[51] Int. Cl.$^4$ .................. F16H 15/40; F16H 15/08
[52] U.S. Cl. ........................ 74/200; 74/190; 74/99 A; 74/199
[58] Field of Search ......... 74/200, 201, 199, 190, 74/190.5, 194, 206, 208, 721, 424.8 W, 99 A, 99 I; 92/31 R

[56] References Cited

U.S. PATENT DOCUMENTS

| | | |
|---|---|---|
| 2,748,614 | 6/1956 | Weisel .................... 74/200 |
| 2,907,220 | 10/1959 | Weisel .................... 74/200 |
| 3,030,817 | 4/1962 | Tomaszek et al. ........ 74/200 |
| 3,087,348 | 4/1963 | Kraus ..................... 74/200 |
| 3,163,051 | 12/1964 | Kraus ..................... 74/200 |
| 4,086,820 | 5/1978 | Kraus et al. ............. 74/200 |
| 4,386,536 | 6/1983 | Kraus ..................... 74/200 |
| 4,434,675 | 3/1984 | Kraus ..................... 74/200 |
| 4,444,068 | 4/1984 | Kraus ..................... 74/200 |

Primary Examiner—Lawrence J. Staab
Assistant Examiner—M. Bednarek
Attorney, Agent, or Firm—Wyatt, Gerber, Shoup, Scobey and Badie

[57] ABSTRACT

An infinitely variable traction roller transmission having a housing, input and output shafts rotatably and coaxially journaled to the housing, input and output toric discs mounted on the input and output shafts and rotatable together while being firmly engaged with the shafts, the opposed surfaces of the toric discs cooperating with each other to form a toroidal cavity, a plurality of traction rollers disposed in the toroidal cavity symmetrically with the axis of the input and output shafts, a trunnion device rotatably supporting the traction rollers and pivotably supporting the vicinity of a pivot axis perpendicular to the rotational axis thereof, and forcing means for firmer engaging the input and output toric discs with the traction rollers and generating a traction force, is provided with a support device for mounting the trunnion device on the housing for slight movement in the direction of the pivot axis, a displacing device provided at the end of the pivot axis of the trunnion device to displace the trunnion device in the axial direction, and a spring device cooperating with the displacing device in accordance with the amount of displacement of the displacing device resulting from said rotational movement.

15 Claims, 9 Drawing Figures

INFINITELY VARIABLE TRACTION ROLLER TRANSMISSION

This application is a continuation of Ser. No. 06/447,684 filed Dec. 7, 1982 now abandoned.

BACKGROUND OF THE INVENTION

Field of the Invention

This invention relates to an infinitely variable traction roller transmission. More particularly, it relates to an infinitely variable transmission in which the opposed surfaces of an input toric disc and an output toric disc mounted on input and output shafts, respectively, disposed on the same axis cooperate with each other to form a toroidal cavity and traction rollers are disposed in the toroidal cavity and are firmly engaged with the input and output toric discs so that a large torque is transmitted by a traction force created in the engaged portion.

SUMMARY OF THE INVENTION

It is an object of the present invention to provide an infinitely variable traction roller transmission which is automatically transmission-controlled in conformity with any fluctuation of the load of the output shaft, whereby the input torque or the output torque can be maintained at a predetermined value.

It is a further object of the present invention to provide an infinitely variable transmission which permits automatic transmission control for running an engine with a predetermined torque approximate to a minimum fuel consumption running curve when an engine torque is input as the reduction ratio of a vehicle and to enable great betterment of the fuel economy.

Another object of the present invention is to provide a transmission for driving auxiliary equipments of the engine for automotive vehicle, for example, loads whose torques are substantially primarily determined by the rotating speed, such as a fan, a water pump and a dynamo, at a predetermined rotating speed irrespective of any fluctuation of the input revolution-rate.

The transmission control mechanism of the present invention is a simple one which merely comprises a combination of a displacing device and a balance spring and accordingly can be put into practice at low cost.

The invention will become fully apparent from the following detailed description thereof taken in conjunction with the accompanying drawings.

DESCRIPTION OF THE PREFERRED EMBODIMENTS

Figure 1:
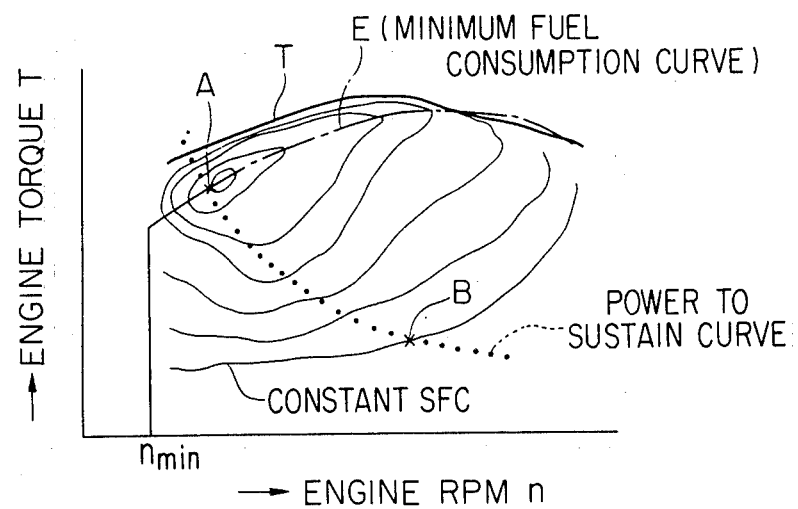
FIG. 1 is a graph showing general engine performance curves.

Generally, internal combustion engines differ in fuel consumption even for the same output horse power (=engine speed×torque ) depending on the running conditions, and the fuel consumption is smaller when the engine is run at point A in FIG. 1 than when it is run at point B in FIG. 1. The minimum fuel consumption running curve E is a curve passing through points whereat the fuel consumption is smallest for various output horse powers. This curve is nearly to the maximum output torque curve T of the engine. That is, it will be seen that if the horse power is the same, the fuel consumption is lower when the engine is run at a low speed high torque than when it is run at a high speed low torque. However, if the engine speed becomes lower than n min shown in FIG. 1, the smooth running of the engine will not be obtained.

Figure 2:
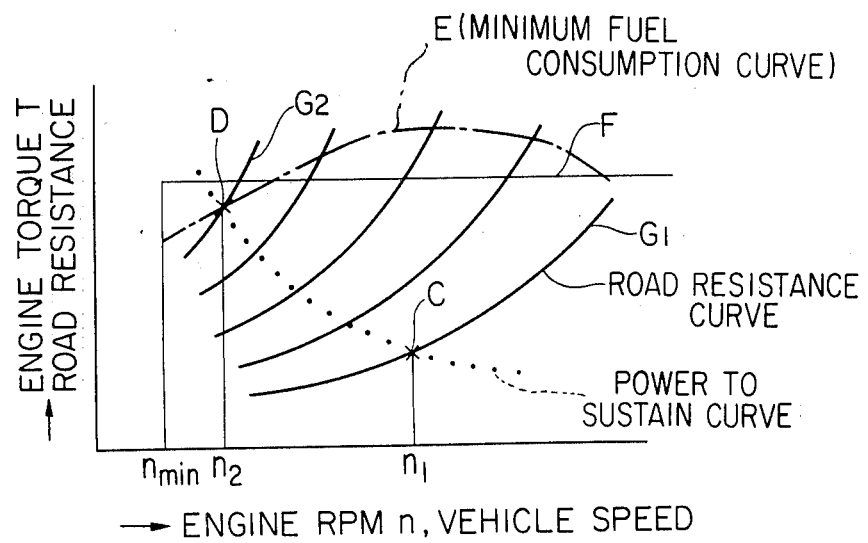
FIG. 2 is a graph showing the tire/road resistance curves of a vehicle.

Now, in a vehicle, the tire/road resistance corresponding to the engine speed with the reduction ratio G as a parameter is such as shown in FIG. 2. As is apparent from this figure, if the reduction ratio is $G_1$ and the engine speed is increased to $n_1$, the vehicle moves at the condition of point C in FIG. 2. In this case, however, the speed of the vehicle is $n_1 \cdot G_1$, but the fuel consumption is very expensive as will be seen if FIG. 2 is viewed in combination with FIG. 1. If the engine can be run at a number of revolution $n_2$ and an engine torque corresponding to the cross point of intersection D between the power to sustain indicated by dotted line which passes through the point C and the minimum fuel consumption running curve E, the most economical (minimum fuel expense) travelling will become possible. Since this tire/road resistance corresponds to a reduction ratio $G_2$, the reduction ratio of the vehicle may be decreased to $G_2$ and the engine speed decreased to $n_2$. That is, the travelling along the shown minimum fuel consumption running curve E becomes possible by selecting an optimum reduction ratio corresponding to the vehicle speed. However, as seen from the figure, this reduction ratio continuously varies with the vehicle speed and therefore, to satisfy the foregoing, an infinitely variable transmission is necessary. It is also necessary to constantly control the transmission ratio of the infinitely variable transmission so that during the travelling the engine is always run along said minimum fuel consumption running curve E.

There is a transmission which uses a servo valve as disclosed, for example, in U.S. Pat. No.3,810,398 for the purpose of such control. This is provided with a hydraulic rotary piston, a piston for axial movement and a lever for detecting the angle of pivotal movement of the trunnion supporting a traction roller, and is very much complicated in structure and adjustment and particularly, the use of the servo valve has led to the liability to cause hunting as well as heavy-weight, large size and high cost.

Another transmission is disclosed in U.S. Pat. No. 4,086,820, but this is provided with a precess cam and a hydraulic cylinder and is therefore complicated in structure similarly to what has been described just above, and more particularly, the thrust exerted on the precess cam has been great and thus, high cost has been unavoidable.

The present invention overcomes the above-noted disadvantages peculiar to the prior art and some embodiments thereof will hereinafter be described with reference to the drawings.

Figure 3:
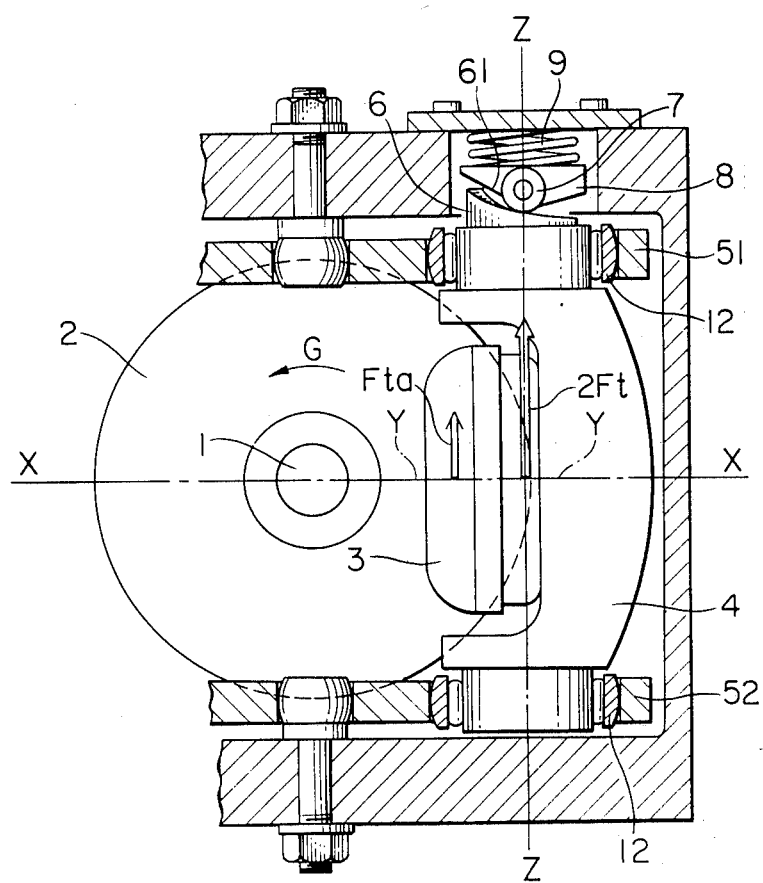
FIG. 3 is a partial transverse cross-sectional view of an infinitely variable traction roller transmission according to a first embodiment of the present invention.

FIG. 3 is a transverse cross-sectional view of an infinitely variable traction roller transmission according to a first embodiment of the present invention and shows only the right half of such transmission because it is bilaterally point-symmetrical with respect to input and output shafts. An input toric disc 2 is mounted on the input shaft 1 shown as an end surface, and they are engaged with each other by means of an forcing member, not shown, in a well-known manner so that they are rotatable together. Although not shown, an output shaft and an output toric disc are likewise provided on this side of the transmission.

Between the input toric disc 2 and the output toric disc, a plurality of traction rollers 3 are disposed and rotatably supported by a trunnion 4 and are urged into engagement with the input and output toric discs. The trunnion 4 is held on tension members 51, 52 through a spherical-configured bearing 12 and is rotatable about a pivot axis Z—Z and slightly movable in the direction of the axis Z—Z.

A thrust cam 6 is formed at the shaft end of the trunnion 4 and is designed to compress a spring 9 through a cam follower 7 and a holder 8.

The spring 9 is a compression coil spring having a predetermined spring constant, and the cam lift curve of the cam surface 61 of the thrust cam 6 is set so that the compression force created in the spring 9 correspondingly to the amount of lift of the cam surface 61 resulting from the rotational movement of the trunnion 4 balances with the traction forces (to be described) then caused between the input and output toric discs and the traction rollers 3.

Alternatively, the cam surface 61 of said thrust cam 6 is formed into an inclined surface having a predetermined degree of inclination and the spring constant of said spring 9 is of non-linearity so that the spring force created in the spring 9 correspondingly to the amount of lift of said cam surface 61 resulting from the rotational movement of the trunnion 4 balances with said traction forces.

Figure 4:
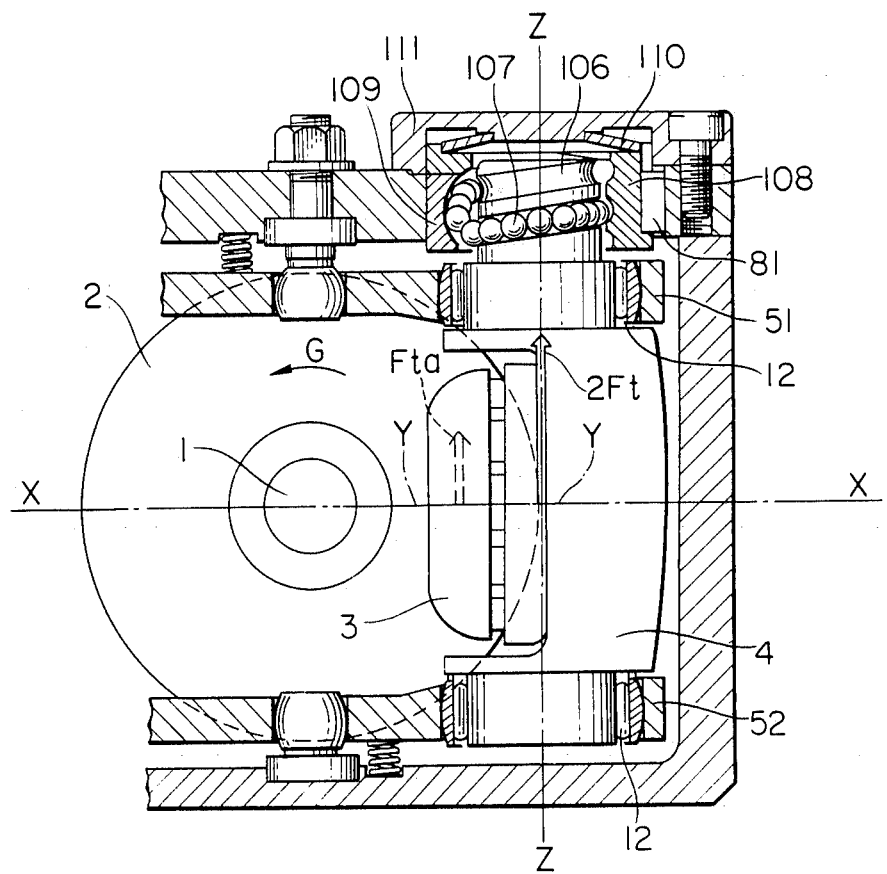
FIG. 4 is a partial transverse cross-sectional view of an infinitely variable traction roller transmission according to a second embodiment of the present invention.
Figure 5:
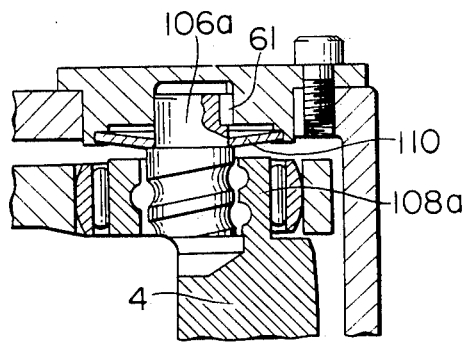
FIG. 5 is a cross-sectional view of the end portion of the trunnion shaft of a modification of the second embodiment.

Reference is now had to FIG. 4 to describe a second embodiment of the present invention. FIG. 5 shows a modification of the second embodiment. In FIGS. 4 and 5, members similar to those of FIG. 3 are given similar reference numerals.

FIG. 4 is a transverse cross-sectional view of an infinitely variable traction roller transmission according to the second embodiment of the present invention and shows only the right half of such transmission because it is bilaterally point-symmetrical with respect to input and output shafts. An input disc 2 is mounted on the input shaft 1 shown as an end surface, and they are engaged with each other by means of an forcing member, not shown, in a well-known manner so that they are rotatable together. Although not shown, an output shaft and an output toric disc are likewise provided on this side of the transmission.

Between the input toric disc 2 and the output toric disc, a plurality of traction rollers 3 are disposed and rotatably supported by a trunnion 4 and are urged into engagement with the input and output toric discs. The trunnion 4 is held on tension members 51, 52 through a spherical-configured bearing 12 and is rotatable about a pivot axis Z—Z and slightly movable in the direction of the axis Z—Z.

A screw shaft 106 of a ball screw is formed at the shaft end of the trunnion 4 and a ball nut 108 is threadably engaged with the screw shaft 106 through balls 107. Designated by 109 is a piece in which the balls 107 circulate. A Belleville spring 110 is bridged between the upper end surface of the ball nut 108 and the lid 111 of a housing. The ball nut 108 is keyed by a slide key 81 so that it is movable axially but not rotatable. The spring force of the Belleville spring 110, as will hereinafter be described, is set so that it balances with the traction force 2 Ft concerned with the transmission ratio G at that point of time.

Alternatively, as shown in FIG. 5, a ball nut 108a may be formed at the shaft end of the trunnion 4, a screw shaft 106a may be mounted on the housing by the use of a slide key 61 for keying and said Belleville spring 110 may be bridged between the screw shaft 106a and the housing to normally pre-loads the trunnion 4 in the direction of the axis Z—Z.

Figure 6A:
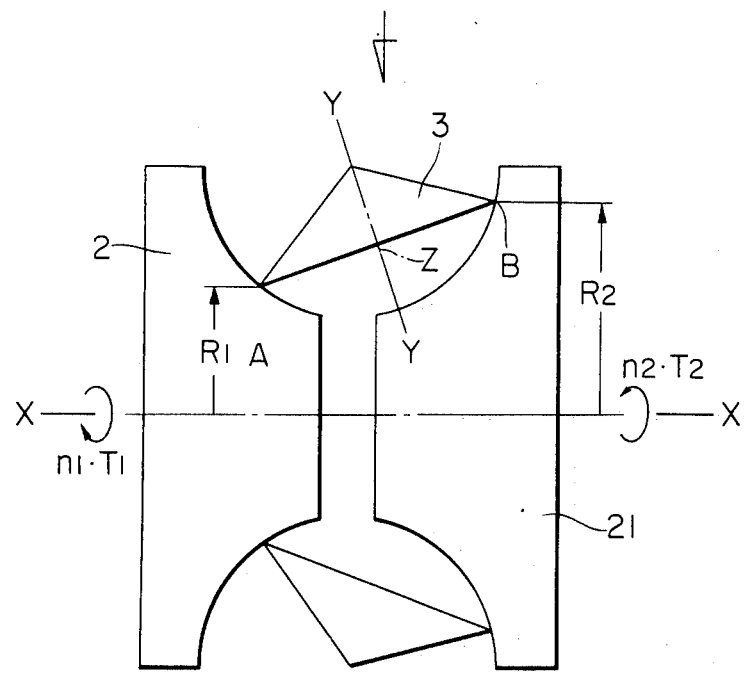
FIG. 6A is a principle diagram illustrating the speed changing function of the infinitely variable traction roller transmission.

The speed changing function of the traction roller transmission having the above-described construction will hereinafter be described in detail. In the principle diagram of FIG. 6A, the input toric disc 2 and the output toric disc 21 are both on the input-output axis X—X and are engaged with the traction roller 3 at points A and B, respectively. If the radii of rotation of these points A and B are $R_1$ and $R_2$, respectively, then transmission ratio G is $$G = \frac{n_2}{n_1} = \frac{R_1}{R_2} \tag{1}$$

where $n_1$ and $n_2$ are the numbers of revolutions of the input and output toric discs 2 and 21, respectively. For the input torque $T_1$, the output torque $T_2$ is $$T_2 = \frac{T_1}{G} = \frac{T_1}{R_1} R_2 \tag{2}$$

However, it is to be understood that there is no loss at each engaged point A and B and that efficiency is 100%.

Figure 6B:
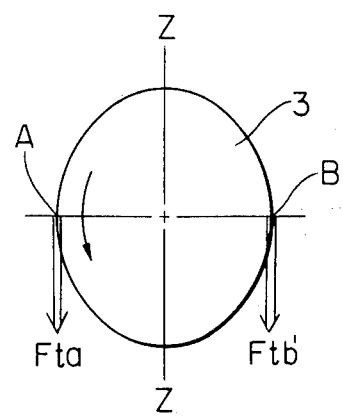
FIG. 6B is a view taken along the arrow B of FIG. 6A.

At the point A, from the input toric disc 2 to the traction roller 3, the traction force Fta of the following equation (3) acts perpendicularly to the plane of the drawing sheet (see FIG. 6B):

$$Fta = \frac{T_1}{R_1} \tag{3}$$

At the point B, a traction reaction force represented by the following equation acts on the traction roller 3:

$$Ftb' = \frac{T_2}{R_2} \tag{4}$$

These traction forces Fta and Ftb' are identical in direction and equal in magnitude.

$$Fta = Ftb' = Ft = \frac{T_1}{R_1} = \frac{T_2}{R_2} \qquad (5)$$

Accordingly, a force 2 Ft acts on the rotational axis Y—Y of the traction roller 3 and the pivot axis Z—Z of the trunnion supporting the traction roller, in the direction of the axis Z—Z.

As is apparent from equation (5), if the radius $R_1$ of the engagement circle of the input toric disc 2 and the traction roller 3 changes when the input torque $T_1$ is constant, that is, if the transmission ratio G varies, the traction force Ft also varies. Also, the force which urges the input and output toric discs and the traction roller into engagement with each other must be above level corresponding to said traction force Ft.

Now, it is known that if the traction roller 3 is displaced in the direction of the pivot axis Z—Z of the trunnion 4, the traction roller 3 rotates about the pivot axis Z—Z. That is, in the traction roller transmission, if the traction roller is displaced in the direction of the pivot axis, the transmission ratio can be changed.

Figure 7:
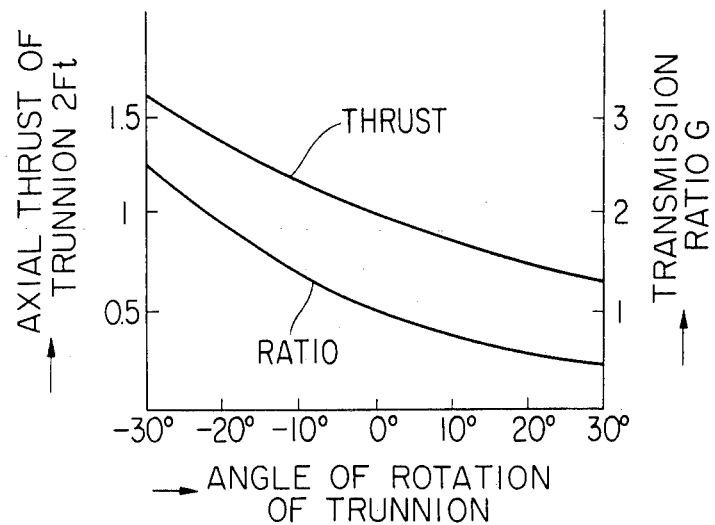
FIG. 7 is a graph showing the relation of transmission ratio and thrust to the angle of pivotal movement of the trunnion.
Figure 8:
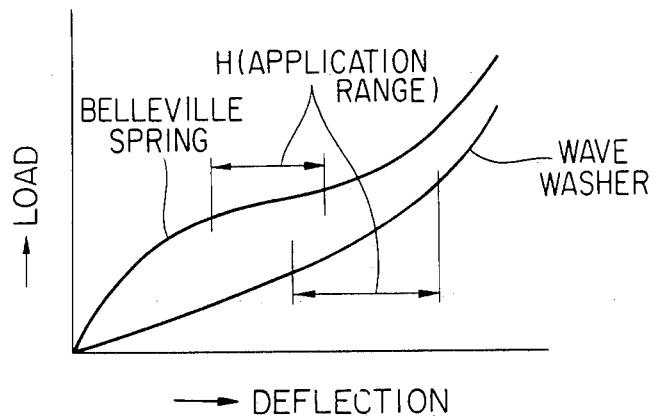
FIG. 8 is a graph showing the characteristics of a non-linear spring.

The relation between the angle of rotation about the axis Z—Z and the transmission ratio and the relation between said transmission ratio and said thrust 2 Ft when the input torque $T_1$ is constant in relation to said transmission ratio are as shown in FIG. 7, wherein it is apparent that these relations rectilinearly varies relative to the angle of rotation. Since, however, the ball screw device in the second embodiment is displaced in linear proportion to the angle of rotation, said spring device which should balance with the thrust 2 Ft varied non-rectilinearly should be a Belleville spring or a wave washer which is a non-linear spring. Incidentally, the spring characteristics of these springs are as shown in FIG. 8, and the usage range H thereof is set on the basis of the specification of the respective springs or the transmission.

Assuming that in FIGS. 3, 4 and 5 the input shaft 1 and the input toric disc 2 rotate in the direction of arrow G and the compression force of the spring 9 (FIG. 4) or the plate spring 110 (FIGS. 4 and 5) just balances when the traction force 2 Ft is acting in the direction of the pivot axis Z—Z of the traction roller 3, the rotational axis Y—Y of the traction roller 3 and the center line X—X of the input and output shafts intersect each other in this condition and the displacement in the direction of the pivot axis Z—Z as previously mentioned does not occur and therefore, rotation of the trunnion 4 about the pivot axis does not occur and the traction roller rotates with the transmission ratio unchanged.

However, if the output torque $T_2$ varies from said condition, the value of Ft varies as is clear from equation (5). Accordingly, the height of the spring 9 or the Belleville spring 110 varies and the trunnion 4 is displaced in the direction of the pivot axis Z—Z. Thereupon, the trunnion 4 rotates about the pivot axis as previously described and speed change is effected. In that process, the trunnion is caused to restore its original position by the thrust cam in the case of the first embodiment or by the ball screw device in the case of the second embodiment, and the spring force of the spring 9 or the Belleville spring 110 varies every moment and becomes equal to the value of 2 Ft, and said displacement and rotation stop with the balanced condition being kept. As described above, the transmission ratio can automatically vary in acordance with the variation in the output torque $T_2$ to thereby maintain the input torque constant.

If the input and output shafts are used reversely, the transmission can be run while maintaining the output torque at a predetermined value.

As described above, the present invention provides a practical and inexpensive infinitely variable traction roller transmission by adopting a simple structure comprising a combination of a displacing device such as a thrust cam and a spring device and a balance spring instead of employing the complicated hydraulic servo mechanism or the like of the prior art, and when it is used as a reduction gear for vehicle, the vehicle speed can be automatically changed while the engine torque is maintained at a substantially constant torque—line F of FIG. 2—which is approximate to the minimum fuel consumption running curve, and thus it becomes easy to greatly improve the specific fuel consumption of the vehicle.

I claim:

1. An infinitely variable traction roller transmission having a housing, input and output shafts rotably and coaxially journaled to said housing, input and output toric discs mounted on said input and output shafts and rotatable together while being engaged with said shafts, the opposed surfaces of said toric discs cooperating with each other to form a toroidal cavity, a plurality of traction rollers disposed in said toroidal cavity symmetrically with the axis of said input and output shafts, a trunnion device rotably supporting said traction rollers and pivotably supporting the axis of said traction rollers perpendicular to the rotational axis thereof, said trunnion device having a central pivot, and forcing means for firmly engaging said input and output toric discs with said traction rollers and generating a traction force, characterized by the provision of a support device for mounting said trunnion device on said housing for slight translational movement in the direction of the pivot axis, a displacing device provided at the end of the pivot axis of said trunnion device to displace said trunnion device in the rotational direction about its axis, and a spring device acting on said displacing device in accordance with the amount of displacement of said displacing device resulting from said translational movement and in opposition to said translational displacement providing the sole return force to rotate said trunnion device about its axis to balance said displacement.

2. An infinitely variable traction roller transmission according to claim 1, wherein said displacing device is a thrust cam device.

3. An infinitely variable traction roller transmission according to claim 2, wherein said spring device is provided on the axis of said thrust cam device.

4. An infinitely variable traction roller transmission according to claim 2, wherein a compression coil spring of a predetermined spring constant is incorporated in said spring device, and the cam lift curve of said thrust cam device is set so that the compression force of said compression coil spring created in accordance with the amount of lift of said thrust cam device resulting from the rotational movement of said trunnion device balances with the traction force varied with said rotational movement.

5. An infinitely variable traction roller transmission according to claim 2, wherein the cam surface of said thrust cam device is formed as an inclined surface of a predetermined degree of inclination, and a spring member incorporated in said spring device is set so that a spring force created in said spring device in accordance with the amount of cam lift resulting from the rotational movement of said trunnion device balances with the traction force varied with said rotational movement.

6. An infinitely variable traction roller transmission according to claim 1, wherein said displacing device is a screw device.

7. An infinitely variable traction roller transmission according to claim 6, wherein said screw device comprises a combination of a male screw member and a female screw member.

8. An infinitely variable traction roller transmission according to claim 6, wherein said screw device is a ball screw comprising a male screw member, a female screw member, a plurality of balls interposed between the threaded grooves of said screw members.

9. An infinitely variable traction roller transmission according to claim 6, wherein a compression coil spring of a predetermined spring constant is incoporated in said spring device.

10. An infinitely variable traction roller transmission according to any of claims 2 to 6, or wherein the spring device is a spring having a non-linear spring constant and is selected from the group consisting of a Belleville spring and a wave washer.

11. An infinitely variable traction roller transmission according to claim 7, wherein said spring device is provided between the end surface of the female screw member and said housing.

12. An infinitely variable traction roller transmission according to claim 7, wherein said spring device is provided between the shaft end of the male screw member and said housing.

13. An infinitely variable traction roller transmission according to claim 6, wherein said screw device includes a non-rotatable screw member and a rotatable screw member coupled to said non-rotatable screw member, and said spring device is provided between said non-rotatable screw member and said housing.

14. An infinitely variable traction roller transmission having:
a housing;
input and output shafts rotatable and coaxially jounaled to said housing;
input and output toric discs mounted on said input and output shafts, respectively, and rotatable together with said shafts;
the opposed surfaces of said toric discs forming a toroidal cavity therebetween;
a plurality of traction rollers disposed in said toroidal cavity symmetrically with the axis of the input and output shafts;
trunnion devices supporting said traction rollers rotatably about rotational axes perpendicular to respective stationery pivot axes of the trunnion devices which reside on a plane perpendicular to the axis of the input and output shafts, said rotational axes being perpendicular to the axes of the input and output shafts in an inchronous transmission state;
support means for supporting the trunnion devices such that the traction rollers engage said input and output toric discs so as to generate traction forces on the traction rollers, said support means supporting the trunnion devices rotatably about the pivot axes and displaceably in the direction of the pivot axes;
said trunnion devices being displaced in the direction of the pivot axes in response to variations in the traction forces;
spring means generating opposed forces to the traction forces at the axial end of the trunnion devices, said opposed forces changing in accordance with the amount of axial displacement of the trunnion devices; and
adjusting means disposed between the trunnion devices and the spring means, and cooperating with the spring means to rotate the trunnion devices about the pivot axes to thereby return the trunnion devices back to the position where their rotational axes are on respective planes perpendicular to the pivot axes and including the axes of the input and output shafts, so that the traction forces and the opposed forces of spring means may be balanced.

15. An infinitely variable traction roller transmission having:
a housing;
input and output shafts rotatable and coaxially journaled to said housing;
input and output toric discs mounted on said input and output shafts, respectively, and rotatably together with said shafts;
the opposed surfaces of said toric discs forming a toroidal cavity therebetween;
a plurality of traction rollers disposed in said toroidal cavity symmetrically with the axis of the input and output shafts;
trunnion devices supporting said traction rollers rotatably about rotational axes perpendicular to respective stationary pivot axes of the trunnion devices which reside on a plane perpendicular to the axis of the input and output shafts, said rotational axes being perpendicular to the axes of the input and output shafts in an inchronous transmission state;
support means for supporting the trunnion devices such that the traction rollers engage said input and output toric discs so as to generate traction forces on the traction rollers, said support means supporting the trunnion devices rotatably about the pivot axes and translationably displaceably in the direction of the pivot axes;
said trunnion devices being displaced translationably along their pivot axes in response to variations in the traction fores;
spring means at one axial end of the trunnion device for generating opposed forces to the said translational displacement of the trunnion, said opposed spring forces changing in accordance with the amount of said translational displacement of the trunnion devices; and
adjusting means disposed between the trunnion devices and the spring means, and cooperating with the spring means to rotate the trunnion devices about their pivot axes to thereby return the trunnion devices back to the position where their rotational axes are on respective planes perpendicular to the pivot axes and perpendicular to the axes of the input and output shafts, so that the traction forces and the opposed forces of the spring means may be balanced.

* * * * *